(12) United States Patent
Lei et al.

(10) Patent No.: US 12,376,119 B2
(45) Date of Patent: Jul. 29, 2025

(54) METHOD AND APPARATUS FOR HARQ-ACK CODEBOOK DETERMINATION FOR FRAME-BASED EQUIPMENT OPERATION

(71) Applicant: Lenovo (Beijing) Ltd., Beijing (CN)

(72) Inventors: Haipeng Lei, Haidian District (CN); Yu Zhang, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 388 days.

(21) Appl. No.: 17/798,972

(22) PCT Filed: Feb. 14, 2020

(86) PCT No.: PCT/CN2020/075327
§ 371 (c)(1),
(2) Date: Aug. 11, 2022

(87) PCT Pub. No.: WO2021/159487
PCT Pub. Date: Aug. 19, 2021

(65) Prior Publication Data
US 2023/0066773 A1    Mar. 2, 2023

(51) Int. Cl.
*H04W 72/23* (2023.01)
*H04L 1/1829* (2023.01)

(52) U.S. Cl.
CPC ........... *H04W 72/23* (2023.01); *H04L 1/1861* (2013.01)

(58) Field of Classification Search
CPC ... H04L 1/1861; H04L 1/1864; H04L 5/0055; H04W 72/23
See application file for complete search history.

(56) References Cited

U.S. PATENT DOCUMENTS

2019/0306878 A1    10/2019    Zhang et al.
2020/0313803 A1*   10/2020    Khoshnevisan ...... H04L 1/1812
(Continued)

FOREIGN PATENT DOCUMENTS

| CN | 103155467 A | 6/2013 |
| CN | 104396174 A | 3/2015 |

(Continued)

OTHER PUBLICATIONS 202080096408.7 , "Foreign Office Action", CN Application 202080096408.7, Jul. 15, 2024, 18 pages.
(Continued)

*Primary Examiner* — Donald L Mills
(74) *Attorney, Agent, or Firm* — FIG. 1 Patents

(57) ABSTRACT

The present application is related to a method and apparatus for semi-static hybrid automatic repeat request acknowledgement (HARQ-ACK) codebook determination for FBE operation under 3GPP 5G new radio (NR). A method for wireless communications performed by a UE includes: receiving downlink control information (DCI) for scheduling a data transmission in a current periodic channel occupancy; determining whether there is HARQ-ACK feedback corresponding to a data transmission postponed in an earlier periodic channel occupancy; and transmitting a HARQ-ACK codebook in the current periodic channel occupancy, wherein, in response to determining that there is the HARQ-ACK feedback corresponding to the data transmission postponed in the earlier periodic channel occupancy, the HARQ-ACK codebook comprises HARQ-ACK feedback corresponding to the data transmission in the current periodic channel occupancy and the postponed HARQ-ACK feedback corresponding to the data transmission in the earlier periodic channel occupancy.

20 Claims, 9 Drawing Sheets

(56) References Cited

U.S. PATENT DOCUMENTS

| | | | |
|---|---|---|---|
| 2022/0007399 A1* | 1/2022 | Rastegardoost | H04L 1/1854 |
| 2022/0201757 A1* | 6/2022 | Cruz | H04L 1/1896 |

FOREIGN PATENT DOCUMENTS

| | | |
|---|---|---|
| CN | 107332646 A | 11/2017 |
| CN | 109075914 B | 12/2018 |
| CN | 110166180 A | 8/2019 |
| CN | 110351022 A | 10/2019 |
| TW | 201937880 A | 9/2019 |
| WO | 2019095314 A1 | 5/2019 |
| WO | 2019139876 A1 | 7/2019 |

OTHER PUBLICATIONS

Nokia, "Mobility and RRM for NR-based access to Unlicensed Spectrum", 3GPP TSG-RAN WG2 Meeting #102, R2-1807147, Busan, South Korea [retrieved Aug. 23, 2022]. Retrieved from the Internet <https://patents.google.com/patent/US20190306878A1/en?oq=US2019306878A1>., May 2018, 5 Pages.

PCT/CN2020/075327, "International Preliminary Report on Patentability", PCT Application No. PCT/CN2020/075327, Aug. 25, 2022, 5 pages.

PCT/CN2020/075327, "International Search Report and Written Opinion", PCT Application No. PCT/CN2020/075327, Nov. 10, 2020, 7 pages.

20918874.7, "Extended European Search Report", EP Application No. 20918874.7, Sep. 7, 2023, 11 pages.

Vivo, "Discussion on HARQ operation for NR-U", 3GPP TSG RAN WG1 Meeting #96bis, R1-1904067, Xi'an, China [retrieved Jun. 12, 2023]. Retrieved from the Internet <https://www.3gpp.org/ftp/TSG_RAN/WG1_RL1/TSGR1_96b/Docs/?sortby=sizerev>., Apr. 12, 2019, 7 pages.

"Foreign Office Action", CN Application No. 202080096408.7, Nov. 27, 2024, 10 pages.

\* cited by examiner

METHOD AND APPARATUS FOR HARQ-ACK CODEBOOK DETERMINATION FOR FRAME-BASED EQUIPMENT OPERATION

TECHNICAL FIELD

Embodiments of the present disclosure generally relate to wireless communication technology, especially to technology for hybrid automatic repeat request acknowledgement (HARQ-ACK) transmission on unlicensed spectrum under 3GPP (3rd Generation Partnership Project) 5G new radio (NR).

BACKGROUND

During 3GPP Release 13 Long Term Evolution (LTE) Licensed Assisted Access (LAA) study item phase, frame based equipment (FBE) based channel access mechanism is not accepted, while load based equipment (LBE) based channel access mechanism is specified according to wireless fidelity (WiFi) channel access mechanism.

In 3GPP Release 16 the new radio (NR) access on unlicensed spectrum (NR-U), more use cases are targeted. Therefore, FBE based channel access mechanism, which has more benefits compared with LBE based channel access mechanism, has been adopted in 3GPP Release 16 NR-U.

Currently, details regarding determining a HARQ-ACK codebook for a FBE based channel access mechanism have not been discussed in 3GPP 5G NR technology yet.

SUMMARY

Some embodiments of the present application provide a method for wireless communications performed by a user equipment (UE). The method includes: receiving downlink control information (DCI) for scheduling a data transmission in a current periodic channel occupancy; determining whether there is HARQ-ACK feedback corresponding to another data transmission postponed in an earlier periodic channel occupancy; and transmitting a HARQ-ACK codebook in the current periodic channel occupancy, wherein, in response to determining that there is the HARQ-ACK feedback corresponding to the data transmission postponed in the earlier periodic channel occupancy, the HARQ-ACK codebook comprises HARQ-ACK feedback corresponding to the data transmission in the current periodic channel occupancy and the postponed HARQ-ACK feedback corresponding to the data transmission in the earlier periodic channel occupancy.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a method for wireless communications performed by a base station (BS). The method includes: transmitting, to a UE, DCI for scheduling a data transmission in an earlier periodic channel occupancy, wherein the DCI includes an indicator indicating that HARQ-ACK feedback corresponding to the data transmission is postponed; transmitting, to the UE, another DCI for scheduling another data transmission in a current periodic channel occupancy; and receiving, from the UE, a HARQ-ACK codebook in the current periodic channel occupancy, wherein the HARQ-ACK codebook comprises HARQ-ACK feedback corresponding to the data transmission in the current periodic channel occupancy and the HARQ-ACK feedback corresponding to the data transmission in the earlier periodic channel occupancy.

Some embodiments of the present application provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a BS.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
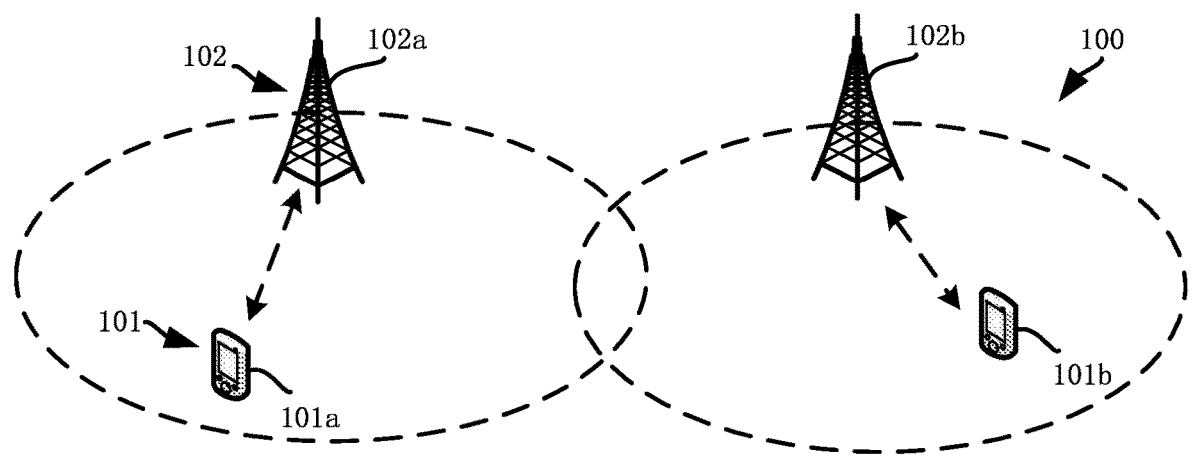
FIG. 1 illustrates a schematic diagram of a wireless communication system 100 in accordance with some embodiments of the present application.

FIG. 1 illustrates a schematic diagram of a wireless communication system 100 in accordance with some embodiments of the present application.

As shown in FIG. 1, the wireless communication system 100 includes at least one user equipment (UE) 101 and at least one base station (BS) 102. In particular, the wireless communication system 100 includes two UEs 101, e.g., UE 101a and UE 101b, and two BSs 102, e.g., BS 102a and BS 102b for illustrative purpose. Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via LTE or NR Uu interface.

In some embodiments of the present application, each of the UE(s) 101 may be deployed an IoT application, an eMBB application and/or a URLLC application. For instance, UE 101a may implement an IoT application and may be named as an IoT UE, while UE 101b may implement an eMBB application and/or a URLLC application and may be named as an eMBB UE, an URLLC UE, or an eMBB/URLLC UE. It is contemplated that the specific type of application(s) deployed in the UE(s) 101 may be varied and not limited.

The BS(s) 102 may be distributed over a geographic region. In certain embodiments of the present disclosure, each of the BS(s) 102 may also be referred to as an access point, an access terminal, a base, a macro cell, a Node-B, an evolved Node B (eNB), a gNB, a Home Node-B, a relay node, or a device, or described using other terminology used in the art. The BS(s) 102 is generally part of a radio access network that may include one or more controllers communicably coupled to one or more corresponding BS(s) 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G new radio of the 3GPP protocol, wherein the BSs 102 transmit data using an orthogonal frequency division multiplexing (OFDM) modulation scheme on the downlink (DL) and the UE(s) 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present disclosure, the BS(s) 102 may communicate using other communication protocols, such as the IEEE 802.11 family of wireless communication protocols. Further, in some embodiments of the present disclosure, the BS(s) 102 may communicate over licensed spectrums, whereas in other embodiments the BS(s) 102 may communicate over unlicensed spectrums. The present disclosure is not intended to be limited to the implementation of any particular wireless communication system architecture or protocol. In yet another embodiment of present disclosure, the BS(s) 102 may communicate with the UE(s) 101 using the 3GPP 5G protocols.

During 3GPP Release 13 LTE LAA study item phase, FBE based channel access mechanism is observed as not aggressive as WiFi channel access mechanism, and FBE nodes cannot get a fair sharing with WiFi on the same unlicensed spectrum. Hence, FBE based channel access mechanism is not accepted in LTE LAA, while LBE based channel access mechanism is specified in LTE LAA.

In 3GPP Release 16 NR-U, more use cases are targeted, such as industrial internet of things (IIoT). In IIoT use case, an operator (e.g., a factory) may have the capability to clear the environment, so as to make sure that there is no other radio access technology (RAT) deployed in the same carrier. In the IIoT use case, FBE based channel access mechanism has more benefits compared with LBE based channel access mechanism. For example, FBE based channel access mechanism brings lower channel access overhead and smaller channel access delay, which are critical for industrial applications. Therefore, FBE based channel access mechanism has been adopted in 3GPP Release 16 NR-U. Under such circumstance, details regarding semi-static HARQ-ACK codebook determination for a FBE based channel access mechanism have not been discussed in 3GPP 5G NR-U.

Embodiments of the present disclosure provide solutions to solve the aforementioned issues of semi-static HARQ-ACK codebook determination for FBE operation in 3GPP 5G NR-U. Embodiments of the present disclosure can ensure both UE side and BS side have the same understanding on the determined semi-static HARQ-ACK codebook. More details on the embodiments of the present disclosure will be illustrated in the following text in combination with the appended drawings.

A frame based equipment (FBE) is a mechanism for device access on unlicensed spectrum. FBE mechanism is also named as semi-static channel access mode in 3GPP standard document TS37.213, because FBE mechanism requires a high layer signaling configured fixed frame period (FFP). A transmitting structure or a receiving structure of an FBE has a periodic timing with a declared periodicity equal to a fixed frame period (FFP) between 1 ms and 10 ms, and a single clear channel access (CCA) slot. One-shot CCA has at least 9 µs sensing interval. CCA may be termed as listen before talk (LBT). One-shot CCA may be termed as one-shot LBT or channel access Type 2 in 3GPP standard document TS37.213. Transmission(s) may start only at the beginning of a FFP immediately following a successful one-shot CCA. Via FBE, if a device finds that a channel is occupied, no transmission occurs on that channel during the following FFP; and if the device finds that the channel is empty, the device can start transmission in the following FFP. A FFP may be termed as a periodic channel occupancy.

Figure 2:
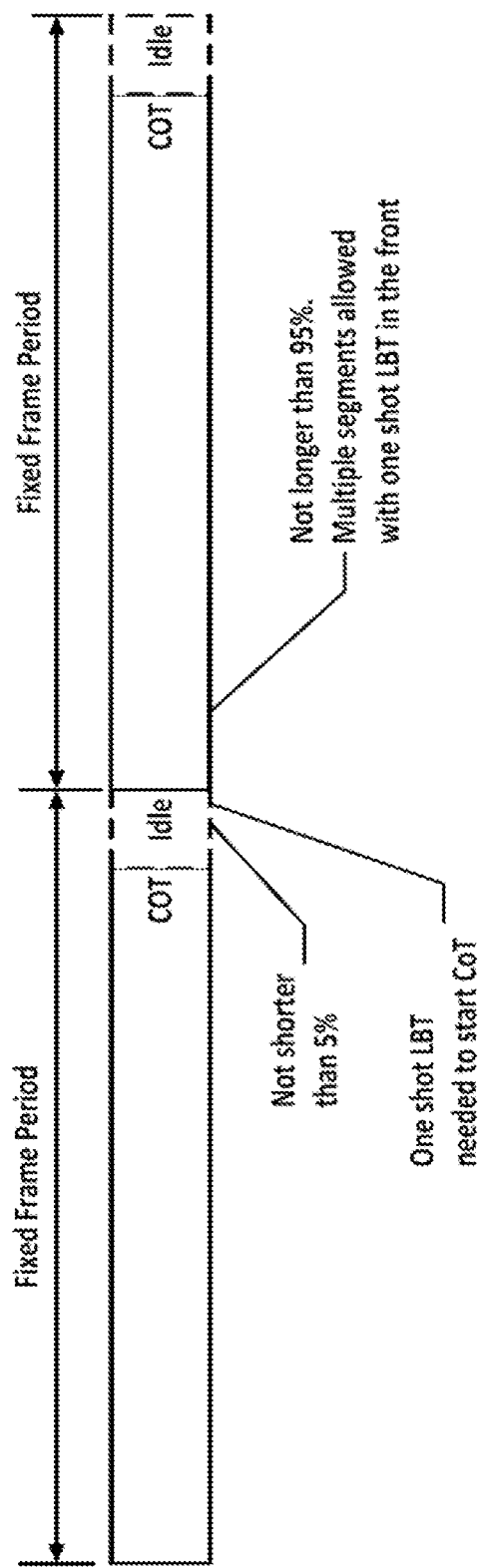
FIG. 2 illustrates an exemplary fixed frame period (FFP) data structure for an FBE in accordance with some embodiments of the present application.

FIG. 2 illustrates an exemplary fixed frame period (FFP) data structure for an FBE in accordance with some embodiments of the present application.

In particular, as shown in FIG. 2, the data structure transmitted by an FBE includes two FFPs. A channel occupancy time (COT) of each FFP is not longer than 95% of the FFP, and the COT is followed by an idle period until the start of the next FFP. The idle period of each FFP is not shorter than 5% of the FFP, with a minimum duration of 100 µs. Although a specific number of FFPs are depicted in FIG. 2, it is contemplated that any number of FFP(s) may be included in a data structure transmitted by an FBE.

Additionally, within a COT of a FFP, multiple DL-to-UL transmission switching subject to a one-shot LBT may be allowed. There is no requirement of a gap between transmission bursts. For example, UE(s), which is served by a BS that wins the contention, may transmit data within the COT of the FFP. In this case, the winning BS may function as an FBE initiating device, and the served UE(s) may function as FBE responding device(s).

Currently, FBE-related agreements for 3GPP Release 16 NR-U are listed below:
(1) For an FBE operation
    FFP configuration is included in System Information Block (SIB)-1
    FFP configuration can be signaled for a UE with UE-specific RRC signaling.
(2) The fixed frame period (FFP) is restricted to values of {1 ms, 2 ms, 2.5 ms, 4 ms, 5 ms, 10 ms}. Each of these values includes an idle period.
(3) The starting positions of FFPs within every two radio frames start from an even radio frame and are given by a product of i and P, i.e., i*P, wherein:
    i={0, 1, . . . , 20/P-1}, and
    P is the fixed frame period in ms.
(4) The idle period for a given subcarrier spacing (SCS) equals to ceil (Minimum idle period allowed by regulations/Ts), wherein:
    Minimum idle period allowed=max (5% of FFP, 100 us), and
    Ts is the symbol duration for the given SCS.

In 3GPP standard document TS37.213, FBE based channel access mechanism is termed as semi-static channel access mode. If higher layer parameters ChannelAccess-Mode-r16='semistatic' by SIB1 or dedicated RRC configuration, a periodic channel occupancy can be initiated and the FFP is configured in RRC parameter semiStaticChannelAccessConfig.

According to the regulatory requirements, an initiating device is mandated to grant an authorization to one or more associated responding devices to transmit on the current operating channel within the current FFP. In particular, as defined in 3GPP standard document TS37.213:

Section 4.2.7.3.1.4: "(3) An Initiating Device is allowed to grant an authorization to one or more associated Responding Devices to transmit on the current Operating Channel within the current Channel Occupancy Time. A Responding Device that receives such a grant shall follow the procedure described in clause 4.2.7.3.1.5."

Section 4.2.7.3.1.5: "Clause 4.2.7.3.1.4, point 3) describes the possibility whereby an Initiating Device grants an authorization to one or more associated Responding Devices to transmit on the current Operating Channel within the current Fixed Frame Period."

Consequently, any transmissions from an FBE responding device are only allowed within the current channel occupancy time or FFP where it is granted by an FBE initiating device. For example, when a BS functions as an FBE initiating device and provides a DL grant or a UL grant to a UE, which is served by the BS, within the current FFP, the UE may function as an FBE responding device and transmit a physical uplink control channel (PUCCH) transmission or a physical uplink shared channel (PUSCH) transmission within the current FFP. The aforementioned regulatory requirements also prohibit any cross-FFP scheduling of UL transmissions and any cross-FFP HARQ-ACK feedback transmission, since such regulatory requirements clearly and specifically mandate that an FBE responding device is allowed to transmit within a FFP only if the transmission grant for that transmission is provided within the same FFP. One specific example is shown in FIG. 3.

Figure 3:
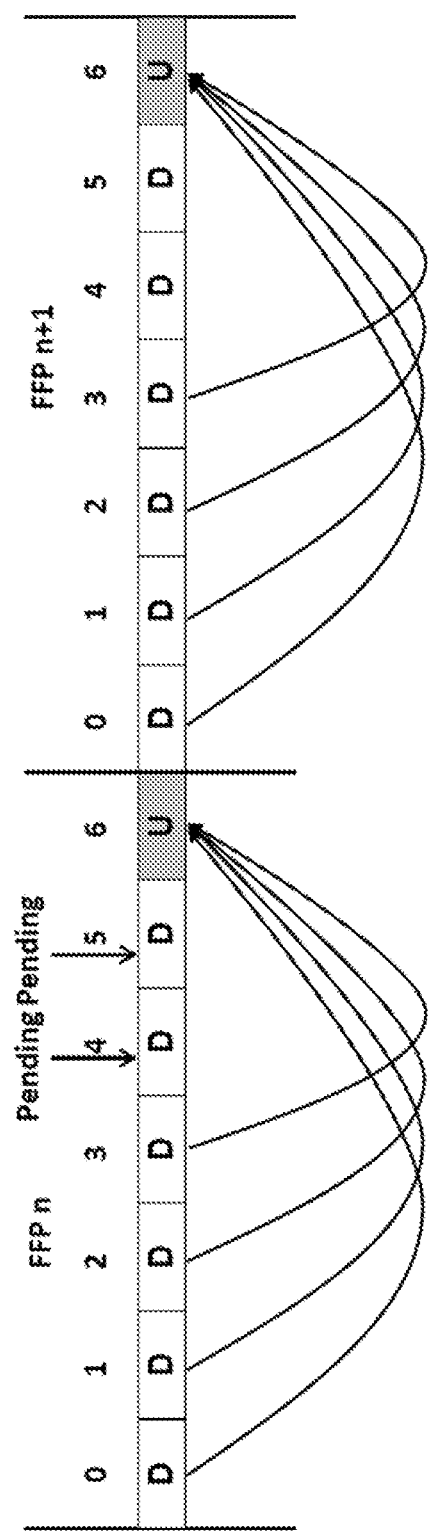
FIG. 3 illustrates an exemplary diagram of intra-FFP scheduling and HARQ-ACK feedback in accordance with some embodiments of the present application.

FIG. 3 illustrates an exemplary diagram of intra-FFP scheduling and HARQ-ACK feedback in accordance with some embodiments of the present application.

In FIG. 3, a FFP is assumed with a duration of 7 ms just for illustrative purpose. Thus, each of FFP n and FFP n+1 is with 7 ms. For example, as an FBE initiating device, a BS (e.g., BS 102a or BS 102b as illustrated and shown in FIG. 1) performs one-shot LBT in an idle period and transmits physical downlink shared channel (PDSCH) transmissions in slot 0 to slot 5 of FFP n if the channel is sensed as idle. Assuming slot 6 of FFP n is indicated for a PUCCH transmission corresponding to the PDSCH transmissions transmitted in slot 0 to slot 3 of FFP n, HARQ-ACK feedback corresponding to slots 4 and 5 of FFP n, which are marked as pending in FIG. 3, can't be transmitted in slot 6 of FFP n, due to a processing delay of a UE (e.g., UE 101a or UE 101b as illustrated and shown in FIG. 1). According to the aforementioned regulatory requirements, HARQ-ACK feedback transmission for slots 4 and 5 of FFP n is not allowed to be directly transmitted in the next FFP, i.e., FFP n+1 as shown in FIG. 3. Hence, the BS has to postpone the HARQ-ACK feedback transmission for slots 4 and 5 of FFP n.

In some embodiments of the present application, in this case, the BS may indicate non-numerical HARQ timing values to postpone the HARQ-ACK feedback and transmit a triggering signaling (e.g., DCI), to trigger the UE to transmit the postponed HARQ-ACK feedback. For instance, DCI in slot 0 of FFP n+1 as shown in FIG. 3 may be used to trigger the UE to report the postponed HARQ-ACK feedback corresponding to slots 4 and 5 of FFP n. In this way, the intra-FFP HARQ-ACK feedback is transmitted in the same FFP (i.e., FFP n+1) with the triggering signaling.

As shown in FIG. 3, FFP n+1 has the same frame structure as FFP n. It can be contemplated that each FFP may have different frame structure dependent on initiating device's scheduling policy. For example, other slot, instead of slot 6, of FFP n+1 may be indicated for PUCCH transmission for PDSCH transmissions in slot 0 to slot 3 of FFP n+1.

For enhanced dynamic HARQ-ACK codebook determination, the postponed HARQ-ACK feedback may be triggered by DL grant in any of slot 0 to slot 3 of FFP n+1 by indicating the same group index to PDSCH transmissions in slots 4 and 5 of FFP n. For one-shot HARQ-ACK feedback, the one-shot triggering signaling (e.g., DCI) in slot 0, 1, 2 or 3 in FFP n+1 may trigger HARQ-ACK feedback(s) for all DL HARQ processes including the postponed HARQ-ACK feedback corresponding to slots 4 and 5 of FFP n. For semi-static HARQ-ACK codebook determination, if a downlink association set corresponding to slot 6 of FFP n+1 doesn't include slots 4 and 5 of FFP n, the postponed HARQ-ACK feedback corresponding to slots 4 and 5 of FFP n can't be transmitted in PUCCH transmission within slot 6 of FFP n+1.

For example, a downlink association set is derived from the K1 set, the K1 set is configured as {non-numerical value, 3, 4, 5, 6}, and the non-numerical value is used to postpone the corresponding HARQ-ACK feedback. In this example, the downlink association set for slot 6 of FFP n+1 includes slots 0, 1, 2, and 3 of FFP n+1, but doesn't include slots 4 and 5 of FFP n. Thus, the postponed HARQ-ACK feedback for slots 4 and 5 of FFP n, which is due to the processing delay of a UE, can't be transmitted in slot 6 of FFP n+1.

Without HARQ-ACK feedback for slots 4 and 5 of FFP n, a BS has to assume that the corresponding DL transmissions (e.g., PDSCH transmissions) in slots 4 and 5 of FFP n are failed and there is a need to retransmit them. In this case, when PDSCH transmissions are transmitted within slots 4 and 5 of FFP n before a PUCCH transmission (e.g., in slot 6 of FFP n), the BS needs to postpone HARQ-ACK feedback corresponding to the PDSCH transmissions in slots 4 and 5 of FFP n, which means losing transmission opportunities.

Via one-shot HARQ-ACK feedback for semi-static HARQ-ACK codebook, the postponed HARQ-ACK feedback may be transmitted in the same FFP as the triggering signaling (e.g., DCI). However, the signaling overhead for one-shot HARQ-ACK codebook is much huge. Using one-shot HARQ-ACK feedback only for a few postponed HARQ-ACK feedback bits is also not economical. Thus, details regarding how to trigger the postponed HARQ-ACK feedback and solve misunderstanding between a BS and a UE on semi-static HARQ-ACK codebook size need to be studied.

Some conventional solutions propose always one bit in semi-static HARQ-ACK codebook for postponed HARQ-ACK feedback, and these solutions give a retransmission opportunity for the postponed HARQ-ACK feedback. One problem of these solutions is that there is always one bit in semi-static HARQ-ACK codebook, regardless whether there is any postponed HARQ-ACK feedback. Another problem of these solutions is that a UE has to perform HARQ-ACK bundling to generate one single bit, if there is more than one postponed HARQ-ACK information bits.

Embodiments of the present application focus on the semi-static HARQ-ACK codebook determination for FBE operation and provide several alternatives for FBE-based semi-static HARQ-ACK codebook determination, to guarantee intra-FFP HARQ-ACK feedback transmission.

Figure 4:
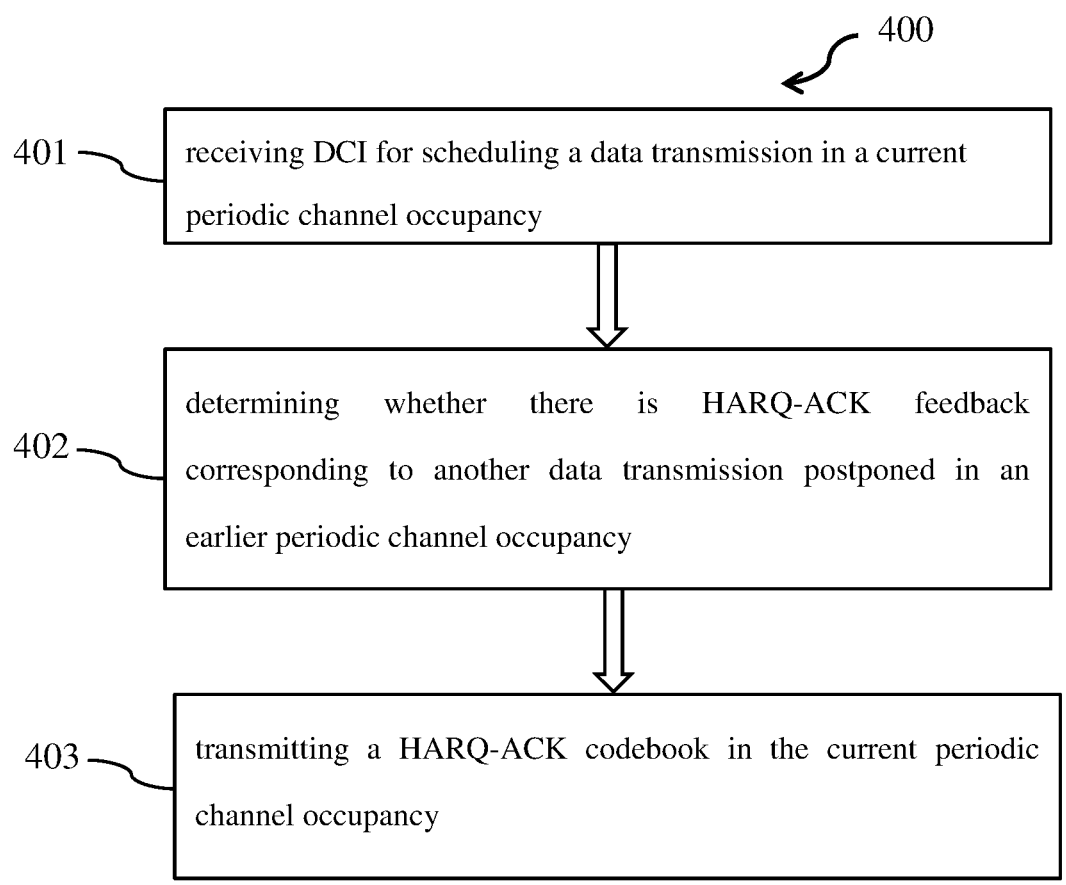
FIG. 4 illustrates a flow chart of a method for wireless communications in accordance with some embodiments of the present application.

FIG. 4 illustrates a flow chart of a method for wireless communications in accordance with some embodiments of the present application. The method may be implemented by a UE (e.g., UE 101a or UE 101b illustrated and shown in FIG. 1).

In the exemplary method 400 as illustrated and shown in FIG. 4, in step 401, a UE receives DCI for scheduling a data transmission in a current periodic channel occupancy. In step 402, the UE determines whether there is HARQ-ACK feedback corresponding to another data transmission postponed in an earlier periodic channel occupancy. In step 403, the UE transmits a HARQ-ACK codebook in the current periodic channel occupancy. In response to determining that there is the HARQ-ACK feedback corresponding to the data transmission postponed in the earlier periodic channel occupancy, the HARQ-ACK codebook comprises both HARQ-ACK feedback corresponding to the data transmission in the current periodic channel occupancy and the HARQ-ACK feedback corresponding to the data transmission postponed in the earlier periodic channel occupancy.

With reference to FIG. 4, in some embodiments of the present application, to determine whether there is HARQ-ACK feedback corresponding to a data transmission postponed in the earlier periodic channel occupancy, the UE may receive (e.g., from the BS) another DCI for scheduling the data transmission in the earlier periodic channel occupancy. The abovementioned another DCI may include an indicator indicating that the HARQ-ACK feedback for the data transmission in the earlier periodic channel occupancy is postponed.

In some embodiments of the present application, the DCI received in step 401 includes an indicator indicating a set of HARQ feedback timing offset values, and the UE determines, based on the set of HARQ feedback timing offset values, whether there is at least one slot in the earlier periodic channel occupancy included in a downlink association set associated with a HARQ-ACK codebook.

In some embodiments of the present application, the DCI received in step 401 includes an indicator indicating a set of HARQ feedback timing offset values from a plurality of sets of HARQ feedback timing offset values. The plurality of sets of HARQ feedback timing offset values may be configured by radio resource control (RRC) signaling. For example, the plurality of sets of HARQ feedback timing offset values include at least one set of HARQ-ACK feedback timing offset values, and the at least one set of HARQ-ACK feedback timing offset values corresponds to a downlink association set including one or more slots in the earlier periodic channel occupancy.

Specifically, in some embodiments of the present application, a plurality of sets of HARQ feedback timing offset values are configured by a BS (e.g., via RRC signaling), and only one set is indicated for a given HARQ-ACK feedback transmission. The sets of HARQ feedback timing offset values may be termed as K1 sets. The configured multiple K1 sets may be defined to cover different HARQ timing ranges. At least one K1 set covers intra-FFP HARQ-ACK feedback transmission (i.e., the downlink association set only incudes slots within the current FFP), and at least another K1 set covers cross-FFP HARQ-ACK feedback transmission (i.e., the downlink association set incudes slots within the current FFP and slots within a previous FFP).

Each K1 set of the configured multiple K1 sets is assigned with a unique index to differentiate from others. A field of K1 set indication may be included in DCI for indicating a specific K1 set for HARQ-ACK feedback transmission. A total number of bits required for indicating the K1 set in the DCI may depend on a total number of the configured multiple K1 sets.

The indicated specific K1 set may be selected by a BS according to whether the postponed HARQ-ACK feedback is included in the corresponding downlink association set. For PDSCH transmission(s) with corresponding HARQ-ACK feedback to be transmitted in the same HARQ-ACK codebook, DCI(s) associated with the PDSCH transmission(s) should indicate the same K1 set for the UE, to derive unambiguous downlink association set.

In short, in the abovementioned embodiments of the present application, multiple K1 sets are configured for covering intra-FFP HARQ-ACK feedback and cross-FFP HARQ-ACK feedback, whereas only one K1 set is dynamically indicated according to whether there is postponed HARQ-ACK feedback in a previous FFP for a given HARQ-ACK feedback transmission. One specific example is shown in FIG. 5.

Figure 5:
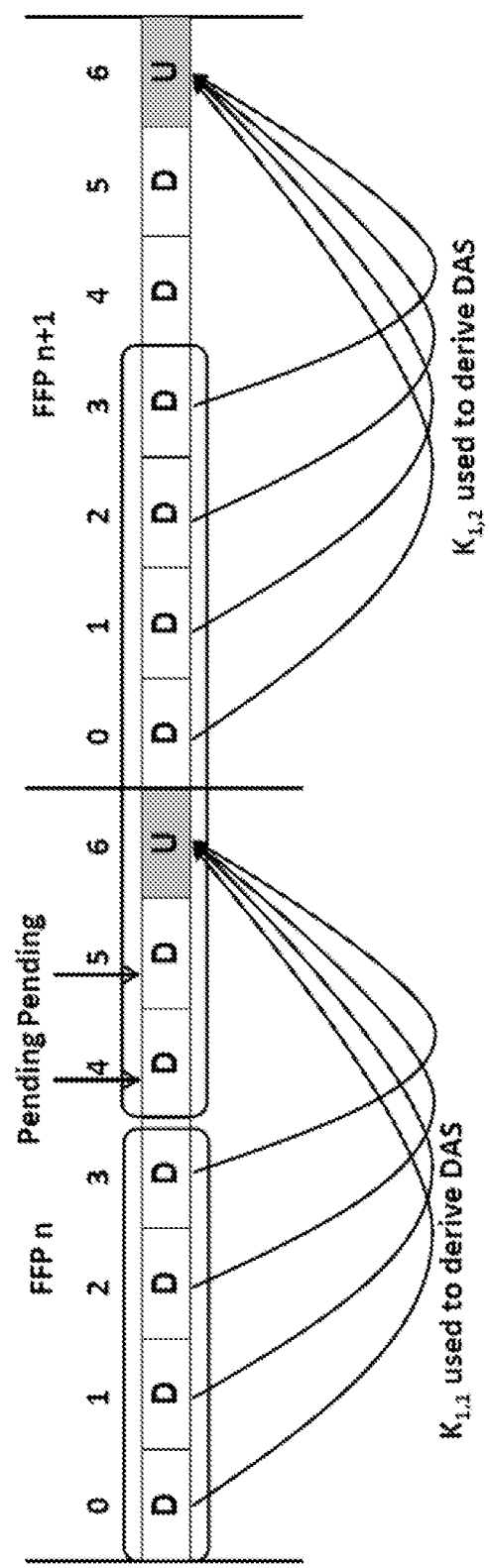
FIG. 5 illustrates an exemplary diagram of retransmitting postponed HARQ-ACK feedback in accordance with some embodiments of the present application.

FIG. 5 illustrates an exemplary diagram of retransmitting postponed HARQ-ACK feedback in accordance with some embodiments of the present application. The embodiments of FIG. 5 are related to the embodiments of FIG. 3.

In accordance with the embodiments of FIG. 3, the following two K1 sets, i.e., $K_{1,1}$ and $K_{1,2}$, may be configured, so that one bit in DCI is enough to indicate which K1 set is used for HARQ-ACK feedback transmission. Each of $K_{1,1}$ and $K_{1,2}$ may be used to derive a downlink association set (DAS).

$K_{1,1}$={non-numerical value, 3, 4, 5, 6}

$K_{1,2}$={non-numerical value, 3, 4, 5, 6, 7, 8, 9}, wherein the non-numerical value is used to postpone the corresponding HARQ-ACK feedback. Alternatively, $K_{1,2}$={3, 4, 5, 6, 7, 8, 9} without inclusion of non-numerical value.

As shown in FIG. 5, for PDSCH transmissions in slots 0, 1, 2, and 3 of FFP n, a BS (e.g., BS 102a or BS 102b as illustrated and shown in FIG. 1) may transmit DCIs associated with these PDSCH transmissions to indicate the same K1 set, e.g., $K_{1,1}$ used to derive DAS shown in FIG. 5. Certain PDSCH-to-HARQ timing fields in the DCIs may indicate that slot 6 of FFP n is targeted for HARQ-ACK feedback transmission corresponding to these PDSCH transmissions. Based on this, a UE (e.g., UE 101a or UE 101b as illustrated and shown in FIG. 1) may derive that the downlink association set for slot 6 of FFP n includes slots 0, 1, 2, and 3 of FFP n, and may attempt to transmit a semi-static HARQ-ACK codebook in slot 6 of FFP n.

In the embodiments of FIG. 5, since the BS indicates non-numerical HARQ timing value for PDSCH transmissions in slot 4 and 5 of FFP n, which are marked as pending in FIG. 5, in order to postpone the corresponding HARQ-ACK feedback, the BS may transmit DCIs associated with PDSCH transmissions in slots 0, 1, 2 and 3 of FFP n+1 to indicate the same K1 set, e.g., $K_{1,2}$ used to derive DAS shown in FIG. 5. Certain PDSCH-to-HARQ timing fields in the DCIs may indicate that slot 6 of FFP n+1 is targeted for HARQ-ACK feedback transmission corresponding to the PDSCH transmissions in slots 0, 1, 2 and 3 of FFP n+1 as well as the PDSCH transmissions in slot 4 and 5 of FFP n. Based on this, the UE may derive that the downlink association set for slot 6 of FFP n+1 includes slots 0, 1, 2, and 3 of FFP n+1 and slot 4 and 5 of FFP n, and may attempt to transmit the semi-static HARQ-ACK codebook in slot 6 of FFP n+1.

Accordingly, in the embodiments of FIG. 5, the HARQ-ACK feedback transmitted in slot 6 of FFP n+1 includes the postponed HARQ-ACK feedback for PDSCH transmissions in slots 4 and 5 of FFP n, and initial HARQ-ACK feedback for PDSCH transmissions in slots 0, 1, 2 and 3 of FFP n+1.

In some further embodiments of the present application, the BS may continue to enlarge a downlink association set (e.g., $K_{1,2}$) to cover more DL slots of FFPs, if more K1 sets with larger values are configured.

Regarding a final HARQ-ACK codebook, in some embodiments of the present application, the final HARQ-ACK codebook comprises of multiple HARQ-ACK sub-codebooks. For instance, a postponed HARQ-ACK sub-codebook includes postponed HARQ-ACK information bits, and a new HARQ-ACK sub-codebook includes non-postponed HARQ-ACK information bits.

In some embodiments of the present application, the postponed sub-codebook may be placed firstly and then concatenated with the new HARQ-ACK sub-codebook as the final HARQ-ACK codebook. Alternatively, the new sub-codebook may be placed firstly and then concatenated with the postponed HARQ-ACK sub-codebook as the final HARQ-ACK codebook.

In some other embodiments of the present application, a final HARQ-ACK codebook comprises all HARQ-ACK information bits for a downlink association set, and the order of HARQ-ACK information bits in the final HARQ-ACK codebook are consistent with the order of values in the downlink association set. For example, the order of HARQ-ACK information bits in the final HARQ-ACK codebook corresponds to the reverse order of offset values 3, 4, 5, 6, 7, 8, 9 in $K_{1,2}$ described in the above embodiments.

In some embodiments of the present application, an existence of postponed HARQ-ACK feedback may be indicated in DCI, which is used for a UE to determine semi-static HARQ-ACK codebook. For example, the DCI received in step 401 includes an indicator indicating an existence of the HARQ-ACK feedback postponed in the earlier periodic channel occupancy.

In response to existing postponed HARQ-ACK feedback, in some embodiments of the present application, the HARQ-ACK feedback postponed in the earlier periodic channel occupancy may be bundled to one bit by performing logic AND operation, and the one bit is included in the HARQ-ACK codebook.

In some other embodiments of the present application, a total number of HARQ-ACK information bits for the HARQ-ACK feedback postponed in the earlier periodic channel occupancy may be configured by RRC signaling, and the total number of HARQ-ACK information bits is included in the HARQ-ACK codebook.

In some further embodiments of the present application, a total number of PDSCH transmissions with postponed HARQ-ACK feedback may be configured by RRC signaling, and a total number of corresponding HARQ-ACK information bits for the postponed PDSCH transmissions may be derived similar to non-postponed PDSCH transmissions. For example, a total number of HARQ-ACK information bits corresponding to the postponed PDSCH transmissions is determined based on the same configured maximum number of transport blocks (TBs) per PDSCH, the same configured maximum number of code block groups (CBGs) per transport block (TB), and the same configured DL carriers within same PUCCH group. Different embodiments may lead to different HARQ-ACK information bits for the postponed HARQ-ACK feedback.

Specifically, in some embodiments of the present application, the existence of postponed HARQ-ACK feedback is indicated in DCI. If a BS (e.g., BS 102a or BS 102b as illustrated and shown in FIG. 1) postpones HARQ-ACK feedback in a previous FFP, the BS may indicate that postponed HARQ-ACK feedback needs to be transmitted with non-postponed HARQ-ACK feedback in the current FFP. If a BS does not postpone any HARQ-ACK feedback in a previous FFP, the BS may indicate that no postponed HARQ-ACK feedback needs to be transmitted with non-postponed HARQ-ACK feedback in the current FFP.

In these embodiments of the present application, one bit in DCI may be used to indicate the existence of postponed HARQ-ACK feedback. For instance, bit "1" in DCI indicates that there is postponed HARQ-ACK feedback, while bit "0" in DCI indicates that there is no postponed HARQ-ACK feedback. Alternatively, bit "0" in DCI indicates that there is postponed HARQ-ACK feedback, while bit "1" in DCI indicates that there is no postponed HARQ-ACK feedback.

At a side of a UE (e.g., UE 101a or UE 101b as illustrated and shown in FIG. 1), upon detecting an existence of the postponed HARQ-ACK feedback, the UE may transmit the postponed HARQ-ACK feedback together with the non-postponed HARQ-ACK feedback in the same HARQ-ACK codebook. Upon detecting nonexistence of any postponed HARQ-ACK feedback, the UE may only transmit the non-postponed HARQ-ACK feedback in the HARQ-ACK codebook. Specific examples are shown in FIGS. 6 and 7.

In particular, in some embodiments of the present application, when a BS decides an existence of postponed HARQ-ACK feedback, when there is one PDSCH transmission in a FFP, DCI associated with the PDSCH transmission indicates a non-numerical HARQ timing value, and the PDSCH transmission is between the last PUCCH transmission occasion and the current PUCCH transmission occasion within the same FFP, the BS may indicate the existence of postponed HARQ-ACK feedback in DCIs scheduling other PDSCH transmissions in the same FFP.

Figure 6:
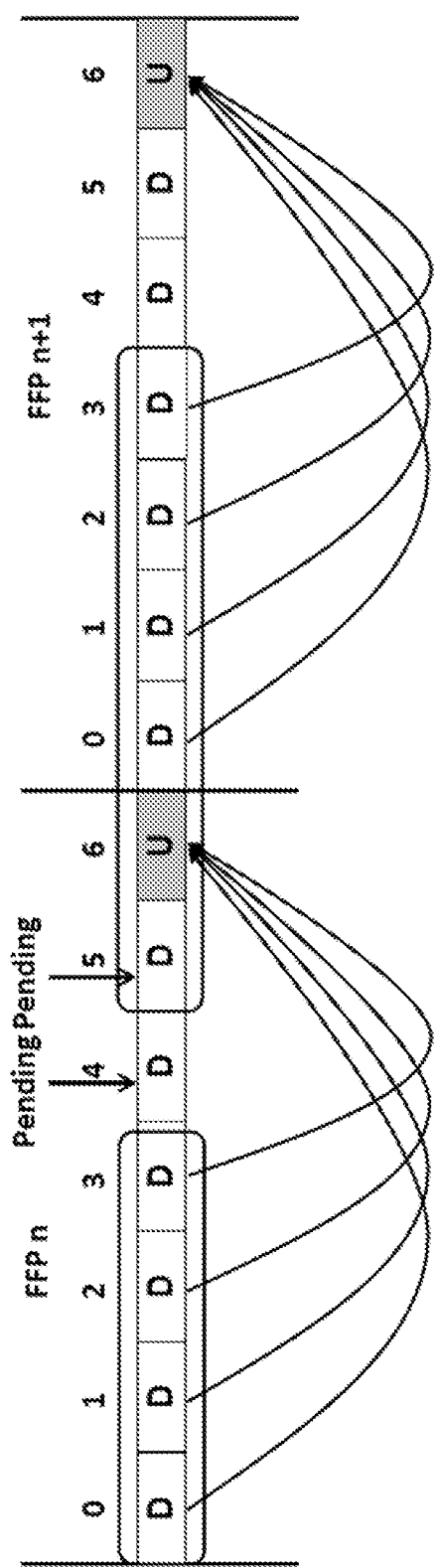
FIG. 6 illustrates a further exemplary diagram of retransmitting postponed HARQ-ACK feedback in accordance with some embodiments of the present application.
Figure 7:
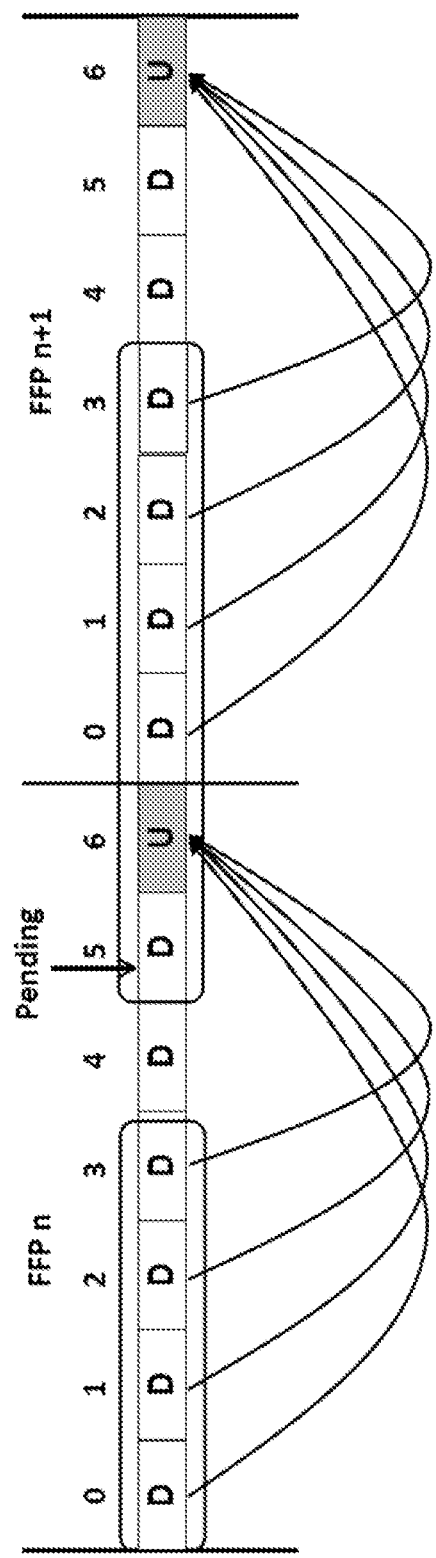
FIG. 7 illustrates another exemplary diagram of retransmitting postponed HARQ-ACK feedback in accordance with some embodiments of the present application.

FIG. 6 illustrates a further exemplary diagram of retransmitting postponed HARQ-ACK feedback in accordance with some embodiments of the present application.

In the embodiments of FIG. 6, assuming K1 set is configured as {non-numerical value, 3, 4, 5, 6, 7, 8}, a BS (e.g., BS 102a or BS 102b as illustrated and shown in FIG. 1) may indicate non-numerical HARQ timing value for PDSCH transmissions in slots 4 and 5 of FFP n, which are marked as pending in FIG. 6, in order to postpone HARQ-ACK feedback corresponding to the PDSCH transmissions in slots 4 and 5 of FFP n, due to a processing delay of a UE (e.g., UE 101a or UE 101b as illustrated and shown in FIG. 1). The associated scheduling DCIs for slots 0, 1, 2 and 3 of FFP n+1 may indicate an existence of PDSCH transmissions with postponed HARQ-ACK feedback in FFP n.

According to the embodiments of FIG. 6, upon detection of such indications from the BS and the associated scheduling DCIs, the UE may determine a semi-static HARQ-ACK codebook in slot 6 in FFP n+1 with consideration of postponed HARQ-ACK information bits corresponding to the PDSCH transmissions in slots 4 and 5 of FFP n. The semi-static HARQ-ACK codebook in slot 6 in FFP n+1 may be determined according to any method described in other embodiments of the present application, e.g., any of FIGS. 2-5.

In some other embodiments of the present application, when a BS decides an existence of postponed HARQ-ACK feedback, when the postponed HARQ-ACK feedback corresponds to a PDSCH in a slot of a previous FFP and the slot is within the current downlink association set (e.g., the K1 set), this postponed HARQ-ACK feedback may not be counted when the BS decides the existence of postponed HARQ-ACK feedback.

FIG. 7 illustrates another exemplary diagram of retransmitting postponed HARQ-ACK feedback in accordance with some embodiments of the present application.

In the embodiments of FIG. 7, assuming K1 set is configured as {non-numerical value, 3, 4, 5, 6, 7, 8}, a BS (e.g., BS 102a or BS 102b as illustrated and shown in FIG. 1) may indicate non-numerical HARQ timing value for PDSCH transmissions in slot 5 in FFP n, which is marked as pending in FIG. 7, in order to postpone the corresponding HARQ-ACK feedback, due to a processing delay of a UE (e.g., UE 101a or UE 101b as illustrated and shown in FIG. 1). The associated scheduling DCIs for slots 0, 1, 2 and 3 in FFP n+1 may indicate nonexistence of PDSCH transmissions with postponed HARQ-ACK feedback, because: slot 5 in FFP n is included in current downlink association set (i.e., the K1 set), and no special handling is required for triggering the postponed HARQ-ACK feedback corresponding to the PDSCH transmissions in slot 5 in FFP n.

According to the embodiments of FIG. 7, upon detection of such indication from the BS and the associated scheduling DCIs, the UE may determine the semi-static HARQ-ACK codebook in slot 6 in FFP n+1 based on a current downlink association set (e.g., the K1 set). The semi-static HARQ-ACK codebook in slot 6 in FFP n+1 may be determined according to any method described in other embodiments of the present application, e.g., any of FIGS. 2-5.

In some embodiments of the present application, a total number of PDSCH transmissions with postponed HARQ-ACK feedback may be indicated in DCI, which is used for a UE to determine a semi-static HARQ-ACK codebook. For example, the DCI received in step 401 includes an indicator indicating a total number of one or more PDSCH transmissions with corresponding HARQ-ACK feedback postponed in the earlier periodic channel occupancy.

Specifically, in some embodiments of the present application, a total number of PDSCH transmission(s) with postponed HARQ-ACK feedback may be indicated in DCI by a BS. If the total number of PDSCH transmission(s) with postponed HARQ-ACK feedback is equal to 0, a UE assumes that there is no postponed HARQ-ACK feedback in a previous FFP, and the semi-static HARQ-ACK codebook transmitted in the current FFP only includes the HARQ-ACK feedback corresponding to PDSCH transmission(s) in the current downlink association set.

If the total number of PDSCH transmission(s) with postponed HARQ-ACK feedback is larger than 0, the UE assumes that there is postponed HARQ-ACK feedback in the previous FFP, and the semi-static HARQ-ACK codebook transmitted in the current FFP includes not only the HARQ-ACK feedback for PDSCH transmission(s) in the current downlink association set but also the postponed HARQ-ACK feedback for PDSCH transmission(s) in the previous FFP.

A total number of HARQ-ACK information bits for the postponed HARQ-ACK feedback may be derived from a total number of PDSCH transmission(s) with postponed HARQ-ACK feedback indicated by the BS in the DCI.

One or more bits in DCI may be used to indicate a total number of PDSCH transmission(s) with postponed HARQ-ACK feedback in a previous FFP. For example, two bits in DCI indicate that there is 0 postponed PDSCH transmission or maximum 3 postponed PDSCH transmissions between the last PUCCH transmission occasion in the previous FFP (e.g., "FFP n" in any of FIGS. 3 and 5-7) and the current PUCCH transmission occasion in the current FFP (e.g., "FFP n+1" in any of FIGS. 3 and 5-7).

In some embodiments of the present application, when a BS decides a total number of PDSCH transmissions with postponed HARQ-ACK feedback, in the case that DCI indicates a non-numerical HARQ timing value, the scheduled PDSCH transmission may be counted in a total number of PDSCH transmissions with postponed HARQ-ACK feedback. A total number of HARQ-ACK information bits corresponding to the postponed PDSCH transmissions may be derived similar to non-postponed PDSCH transmissions.

For example, a total number of HARQ-ACK information bits corresponding to the postponed PDSCH transmissions is derived based on the same configured number of TBs per PDSCH, the same configured max number of CBGs per TB, and the same configured DL carriers within same PUCCH group.

In particular, with reference to the embodiments of FIG. 6, assuming K1 set is configured as {non-numerical value, 3, 4, 5, 6, 7, 8}, the BS indicates non-numerical HARQ timing value for PDSCH transmissions in slots 4 and 5 in FFP n, which are marked as pending in FIG. 6, in order to postpone the corresponding HARQ-ACK feedback, due to a processing delay of a UE, and the associated scheduling DCIs for slots 0, 1, 2 and 3 in FFP n+1 indicate that there are two PDSCH transmissions with postponed HARQ-ACK feedback (i.e., PDSCH transmissions in slot 4 and 5 in FFP n). Upon detection of such indication from the BS and the associated scheduling DCIs, the UE may determine the semi-static HARQ-ACK codebook in slot 6 in FFP n+1 with consideration of the two postponed PDSCH transmissions in slot 4 and 5 in FFP n.

In some other embodiments of the present application, when a BS decides a total number of PDSCH transmissions with postponed HARQ-ACK feedback, in the case that the postponed HARQ-ACK feedback corresponds to a PDSCH transmission in a slot of a previous FFP while the slot is within the current downlink association set (e.g., the K1 set), this PDSCH transmission of the previous FFP may not be counted in the total number of PDSCH transmissions with postponed HARQ-ACK feedback.

In particular, with reference to the embodiments of FIG. 7, assuming K1 set is configured as {non-numerical value, 3, 4, 5, 6, 7, 8}, a BS indicates non-numerical HARQ timing value for PDSCH transmissions in slot 5 in FFP n, which is marked as pending in FIG. 7, in order to postpone the corresponding HARQ-ACK feedback, due to a processing delay of a UE, the associated scheduling DCIs for slot 0, 1, 2 and 3 in FFP n+1 indicate the number of PDSCH transmissions with postponed HARQ-ACK feedback is equal to 0, because: slot 5 in FFP n is included in the current downlink association set (i.e., the K1 set), and no special handling is required for triggering the postponed HARQ-ACK feedback. Upon detection of such indication from the BS and the associated scheduling DCIs, the UE may determine the semi-static HARQ-ACK codebook in slot 6 in FFP n+1 based on the current downlink association set (i.e., the K1 set).

In some embodiments of the present application, a total number of postponed HARQ-ACK information bits may be indicated in DCI, which is used for a UE to determine a semi-static HARQ-ACK codebook. For example, the DCI received in step 401 includes an indicator indicating a total number of HARQ-ACK information bits for the HARQ-ACK feedback postponed in the earlier periodic channel occupancy.

Specifically, a total number of postponed HARQ-ACK information bits may be indicated in DCI by a BS. If the total number of postponed HARQ-ACK information bits is equal to 0, a UE may assume that there is no postponed HARQ-ACK feedback in a previous FFP, and the semi-static HARQ-ACK codebook only includes the HARQ-ACK feedback for PDSCH transmissions in current downlink association set. If the number of postponed HARQ-ACK information bits is larger than 0, the UE may assume that there is postponed HARQ-ACK feedback in the previous FFP, and the semi-static HARQ-ACK codebook includes not only the HARQ-ACK feedback for PDSCH transmissions in current downlink association set but also the postponed HARQ-ACK feedback for PDSCH transmissions in the previous FFP. The total number of postponed HARQ-ACK information bits in a final HARQ-ACK codebook may be the same as the total number of postponed HARQ-ACK information bits indicated by a BS in the DCI.

One or two bits in DCI may be used to indicate a total number of postponed HARQ-ACK information bits. For example, two bits in DCI indicate one value from a set of {0, 1, 2, 3} or a set of {0, 1, 2, 4} or a set of {0, 2, 4, 6} or a set of {0, 2, 4, 8} as a total number of postponed HARQ-ACK information bits between the last PUCCH transmission occasion in FFP n and the current PUCCH transmission occasion in FFP n+1.

In some embodiments of the present application, when determining whether there is HARQ-ACK feedback corresponding to a data transmission postponed in an earlier periodic channel occupancy:

(1) if the data transmission is inside of a downlink association set associated with the HARQ-ACK codebook, the HARQ-ACK feedback corresponding to the data transmission is not counted in the postponed HARQ-ACK feedback; and (2) if the data transmission is outside of the downlink association set associated with the HARQ-ACK codebook and the DCI including an indicator which indicates that the HARQ-ACK feedback corresponding to the data transmission in the earlier periodic channel occupancy is postponed, the HARQ-ACK feedback corresponding to the data transmission is counted in the postponed HARQ-ACK feedback.

In some embodiments of the present application, a processing capability of a UE may be used to implicitly derive a total number of postponed PDSCHs or postponed HARQ-ACK information bits for a UE to determine a semi-static HARQ-ACK codebook. For instance, a maximum number of candidate PDSCH transmissions with corresponding HARQ-ACK feedback postponed in the earlier periodic channel occupancy may be determined based on a processing capability of a UE (e.g., UE 101a or UE 101b as illustrated and shown in FIG. 1). The HARQ-ACK feedback corresponding to the maximum number of candidate PDSCH transmissions may be included in the HARQ-ACK codebook.

More specifically, a processing capability of a UE may be used to determine whether there is candidate postponed PDSCH transmission(s) with corresponding HARQ-ACK feedback not transmitted in the last PUCCH transmission of a FFP (e.g., "FFP n" in any of FIGS. 3 and 5-7), due to a processing delay of the UE. Furthermore, according to the RRC configured candidate physical downlink control channel (PDCCH) monitoring occasions, the UE may further derive the maximum number of candidate PDSCH transmissions which can't be acknowledged in the last PUCCH transmission of the FFP. Regardless whether a BS actually transmits PDSCH transmission(s) or not, the semi-static HARQ-ACK codebook may always include a HARQ-ACK sub-codebook for the maximum number of candidate PDSCH transmissions.

In some embodiments of the present application, a total number of HARQ-ACK information bits corresponding to candidate postponed PDSCH transmissions may be derived the same as non-postponed PDSCH transmissions, e.g., based on the same configured number of TBs per PDSCH, the same configured maximum number of CBGs per TB, and the same configured DL carriers within same PUCCH group.

Figure 8:
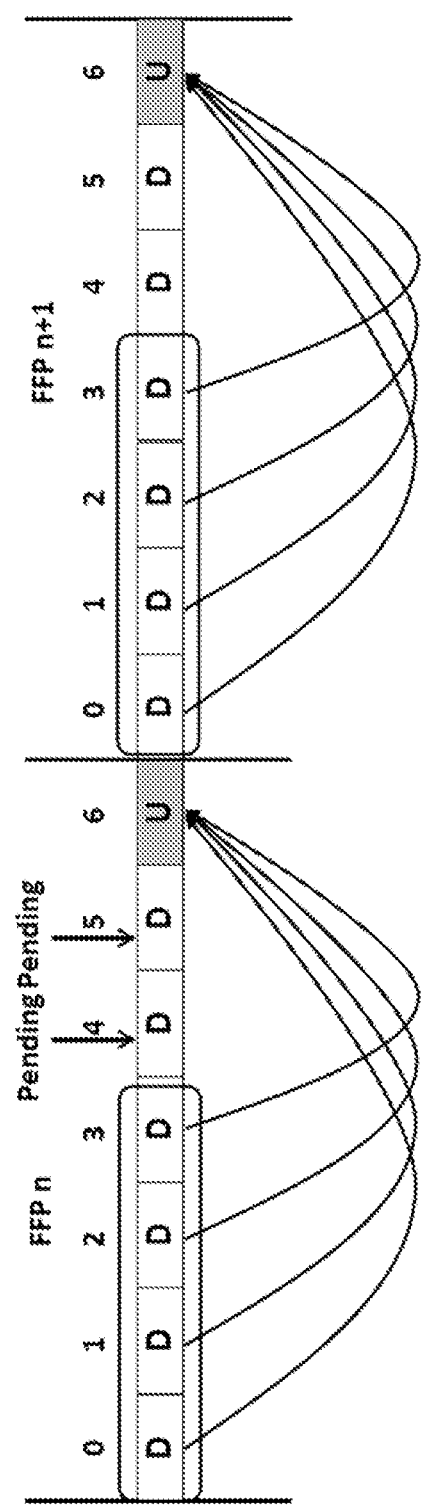
FIG. 8 illustrates an additional exemplary diagram of retransmitting postponed HARQ-ACK feedback in accordance with some embodiments of the present application.

FIG. 8 illustrates an additional exemplary diagram of retransmitting postponed HARQ-ACK feedback in accordance with some embodiments of the present application.

In the embodiments of FIG. 8, assuming K1 set is configured as {non-numerical value, 3, 4, 5, 6}, a BS indicates non-numerical HARQ timing value for PDSCH transmissions in slots 4 and 5 in FFP n, which are marked as pending, in order to postpone the corresponding HARQ-ACK feedback according to a processing capability of a UE. The DCIs schedule PDSCH transmissions in slots 0, 1, 2 and 3 in FFP n+1. The UE may determine the semi-static HARQ-ACK codebook in slot 6 in FFP n+1 with consideration of the two candidate postponed PDSCH transmissions in slots 4 and 5 in FFP n, even if the UE may only receive 0, 1 or 2 PDSCH transmissions in FFP n+1 in case that missing PDCCH transmission(s) may happen or may not happen. The semi-static HARQ-ACK codebook in slot 6 in FFP n+1 may be determined according to any method described in other embodiments of the present application, e.g., any of FIGS. 2-5.

Figure 9:
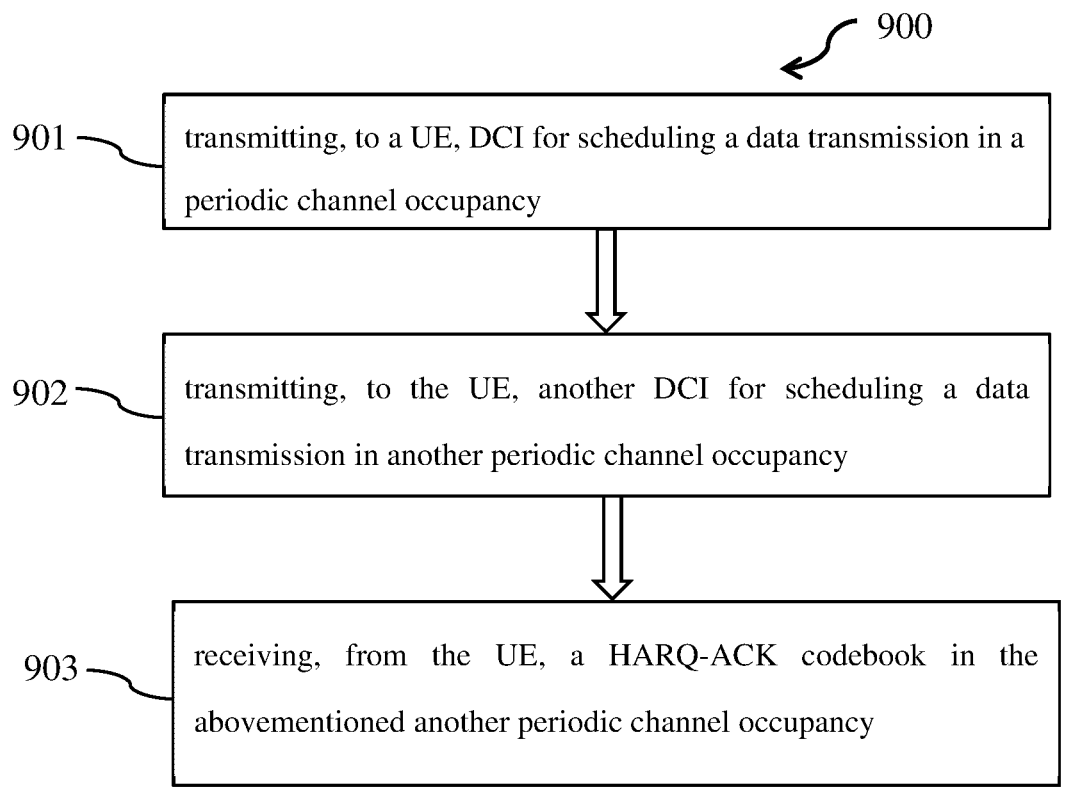
FIG. 9 illustrates another flow chart of a method for wireless communications in accordance with some embodiments of the present application.

FIG. 9 illustrates another flow chart of a method for wireless communications in accordance with some embodiments of the present application. The embodiments of FIG. 9 may be performed by a BS (e.g., BS 102a or BS 102b as illustrated and shown in FIG. 1).

In the exemplary method 900 as illustrated and shown in FIG. 9, in step 901, a BS transmits, to a UE, DCI for scheduling a data transmission in an earlier periodic channel occupancy (e.g., a FFP). The DCI may include an indicator indicating that HARQ-ACK feedback corresponding to the data transmission in the earlier periodic channel occupancy is postponed. In step 902, the BS transmits, to the UE, another DCI for scheduling another data transmission in a subsequent periodic channel occupancy (e.g., a FFP). In step 903, the BS receives, from the UE, a HARQ-ACK codebook in the subsequent periodic channel occupancy. The HARQ-ACK codebook comprises HARQ-ACK feedback corresponding to the data transmission in the subsequent periodic channel occupancy and the HARQ-ACK feedback corresponding to the data transmission in the earlier periodic channel occupancy.

Details described in all other embodiments of the present application (for example, details of how to determine a FBE-based semi-static HARQ-ACK codebook and how to concatenate a final semi-static HARQ-ACK codebook) are applicable for the embodiments of FIG. 9. Moreover, details described in the embodiments of FIG. 10 are applicable for all the embodiments of FIGS. 1-8 and 10.

Figure 10:
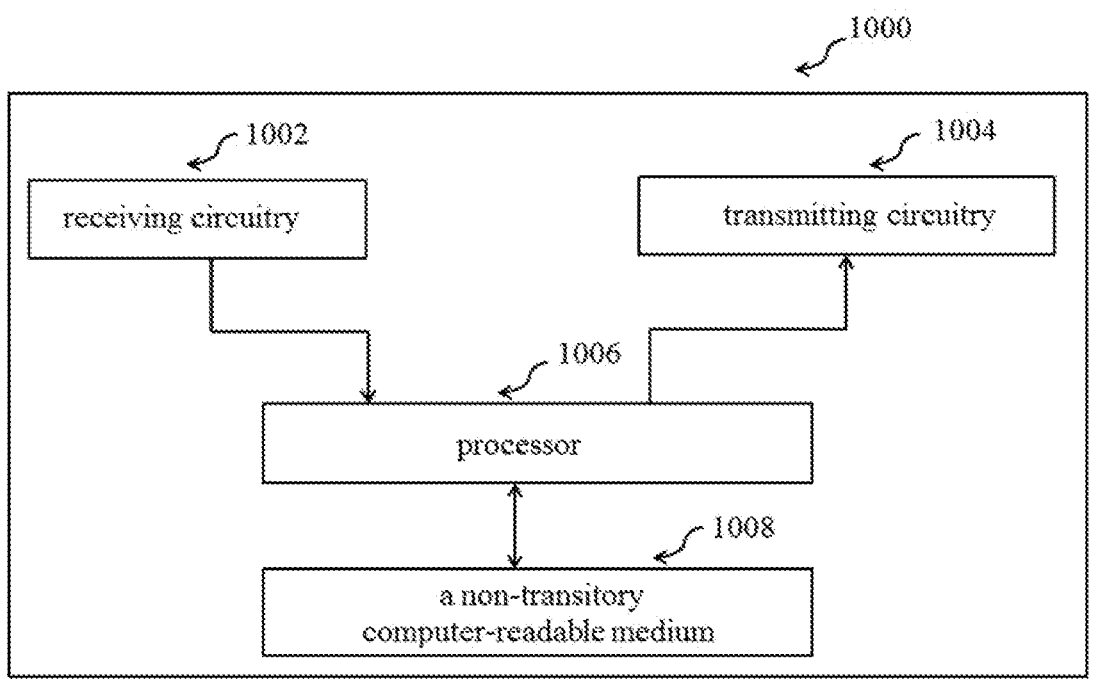
FIG. 10 illustrates a block diagram of an exemplary apparatus in accordance with some embodiments of the present application.

FIG. 10 illustrates a block diagram of an exemplary apparatus in accordance with some embodiments of the present application. Referring to FIG. 10, the apparatus 1000 includes a receiving circuitry 1002, a transmitting circuitry 1004, a processor 1006, and a non-transitory computer-readable medium 1008. The processor 1006 is coupled to the non-transitory computer-readable medium 1008, the receiving circuitry 1002, and the transmitting circuitry 1004.

It is contemplated that some components are omitted in FIG. 10 for simplicity. In some embodiments, the receiving circuitry 1002 and the transmitting circuitry 1004 may be integrated into a single component (e.g., a transceiver).

In some embodiments, the non-transitory computer-readable medium 1008 may have stored thereon computer-executable instructions to cause a processor to implement the operations with respect to UE(s) as described above. For example, upon execution of the computer-executable instructions stored in the non-transitory computer-readable medium 1008, the processor 1006, the receiving circuitry 1002 and the transmitting circuitry 1004 perform the method of FIG. 4, including: the receiving circuitry 1002 receives DCI for scheduling a data transmission in a current periodic channel occupancy; the processor 1006 determines whether there is HARQ-ACK feedback corresponding to another data transmission postponed in an earlier periodic channel occupancy; the transmitting circuitry 1004 transmits a HARQ-ACK codebook in the current periodic channel occupancy, wherein, in response to determining that there is the HARQ-ACK feedback corresponding to the data transmission postponed in the earlier periodic channel occupancy, the HARQ-ACK codebook comprises both the HARQ-ACK feedback corresponding to the data transmission in the earlier periodic channel occupancy and HARQ-ACK feedback corresponding to the data transmission in the current periodic channel occupancy.

In some embodiments, the non-transitory computer-readable medium 1008 may have stored thereon computer-executable instructions to cause a processor to implement the operations with respect to BS(s) as described above. For example, upon execution of the computer-executable instructions stored in the non-transitory computer-readable medium 1008, the processor 1006, the receiving circuitry 1002 and the transmitting circuitry 1004 perform the method of FIG. 9, including: the transmitting circuitry 1004 transmits, to a UE, DCI for scheduling a data transmission in an earlier periodic channel occupancy, wherein the DCI includes an indicator indicating that HARQ-ACK feedback corresponding to the data transmission in the earlier periodic channel occupancy is postponed; the transmitting circuitry 1004 transmits, to the UE, another DCI for scheduling another data transmission in a subsequent periodic channel occupancy; and the receiving circuitry 1002 receives from the UE, a HARQ-ACK codebook in the subsequent periodic channel occupancy, wherein the HARQ-ACK codebook comprises both the HARQ-ACK feedback corresponding to the data transmission in the earlier periodic channel occupancy and HARQ-ACK feedback corresponding to the data transmission in the subsequent periodic channel occupancy.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
   receiving first downlink control information (DCI) for scheduling a first data transmission in a first fixed frame period (FFP);
   receiving second DCI for scheduling a second data transmission in a second FFP that is later than the first FFP;
   receiving indications of downlink association sets which respectively cover intra-FFP hybrid automatic repeat request acknowledgement (HARQ-ACK) feedback and cross-FFP HARQ-ACK feedback;
   determining whether there is HARQ-ACK feedback corresponding to the first data transmission postponed in the first FFP based on the indications of the downlink association sets; and
   transmitting a HARQ-ACK codebook in the second FFP, wherein, in response to determining that the HARQ-ACK feedback corresponding to the first data transmission is postponed in the first FFP, the HARQ-ACK codebook comprises HARQ-ACK feedback corresponding to the second data transmission and the HARQ-ACK feedback corresponding to the first data transmission.

2. The method of claim 1, wherein the first DCI includes a first indicator indicating that the HARQ-ACK feedback corresponding to the first data transmission is postponed.

3. The method of claim 1, wherein determining whether there is the HARQ-ACK feedback corresponding to the first data transmission postponed in the first FFP comprises:
   wherein the second DCI includes a second indicator indicating a set of HARQ feedback timing offset values; and
   determining, based on the set of HARQ feedback timing offset values, whether there is at least one slot in the first FFP included in a downlink association set associated with the HARQ-ACK codebook.

4. The method of claim 1, wherein the second DCI includes a second indicator indicating a set of HARQ feedback timing offset values from a plurality of sets of HARQ feedback timing offset values.

5. The method of claim 4, wherein the plurality of sets of HARQ feedback timing offset values are configured by radio resource control (RRC) signaling.

6. The method of claim 5, wherein the plurality of sets of HARQ feedback timing offset values include at least one set of HARQ-ACK feedback timing offset values, and the at least one set of HARQ-ACK feedback timing offset values corresponds to a downlink association set including one or more slots in the first FFP.

7. The method of claim 1, wherein determining whether there is the HARQ-ACK feedback corresponding to the first data transmission postponed in the first FFP is based on the second DCI includes a second indicator indicating an existence of the HARQ-ACK feedback postponed in the first FFP.

8. The method of claim 1, wherein the second DCI includes a second indicator indicating a total number of one or more physical downlink shared channel (PDSCH) transmissions with corresponding HARQ-ACK feedback postponed in the first FFP.

9. The method of claim 1, wherein the second DCI includes a second indicator indicating a total number of HARQ-ACK information bits for the HARQ-ACK feedback postponed in the first FFP.

10. A user equipment (UE) for wireless communication, comprising:
    at least one memory; and
    at least one processor coupled with the at least one memory and configured to cause the UE to:
    receive first downlink control information (DCI) for scheduling a first data transmission in a first fixed frame period (FFP);
    receive second DCI for scheduling a second data transmission in a second FFP that is later than the first FFP;
    receive indications of downlink association sets which respectively cover intra-FFP hybrid automatic repeat request acknowledgement (HARQ-ACK) feedback and cross-FFP HARQ-ACK feedback;
    determine whether there is HARQ-ACK feedback corresponding to the first data transmission postponed in the first FFP based on the indications of the downlink association sets; and
    transmit a HARQ-ACK codebook in the FFP, wherein, in response to determining that the HARQ-ACK feedback corresponding to the first data transmission is postponed in the first FFP, the HARQ-ACK codebook comprises HARQ-ACK feedback corresponding to the second data transmission and the HARQ-ACK feedback corresponding to the first data transmission.

11. The UE of claim 10, wherein the second DCI includes a second indicator indicating a set of HARQ feedback timing offset values, and to determine whether there is the HARQ-ACK feedback corresponding to the first data transmission postponed in the first FFP, the at least one processor is configured to cause the UE to:
　　determine, based on the set of HARQ feedback timing offset values, whether there is at least one slot in the first FFP included in a downlink association set associated with the HARQ-ACK codebook.

12. The UE of claim 10, wherein the second DCI includes a second indicator indicating a set of HARQ feedback timing offset values from a plurality of sets of HARQ feedback timing offset values.

13. The UE of claim 10, wherein the at least one processor is configured to cause the UE to determine whether there is the HARQ-ACK feedback corresponding to the first data transmission postponed in the first FFP based on the second DCI includes a second indicator indicating an existence of the HARQ-ACK feedback postponed in the first FFP.

14. The UE of claim 10, wherein the second DCI includes a second indicator indicating a total number of one or more physical downlink shared channel (PDSCH) transmissions with corresponding HARQ-ACK feedback postponed in the first FFP.

15. A base station for wireless communication, comprising:
　　at least one memory; and
　　at least one processor coupled with the at least one memory and configured to cause the base station to:
　　　　transmit first downlink control information (DCI) for scheduling a first data transmission in a first fixed frame period (FFP);
　　　　transmit-second DCI for scheduling a second data transmission in a second FFP that is later than the first FFP;
　　　　transmit indications of downlink association sets which respectively cover intra-FFP hybrid automatic repeat request acknowledgment (HARQ-ACK) feedback and cross-FFP HARQ-ACK feedback; and
　　　　receive a HARQ-ACK codebook in the second FFP, wherein, based on the HARQ-ACK feedback corresponding to the first data transmission being postponed in the first FFP and the indications of the downlink association sets, the HARQ-ACK codebook comprises HARQ-ACK feedback corresponding to the second data transmission and the HARQ-ACK feedback corresponding to the first data transmission.

16. The base station of claim 15, wherein the first DCI includes a first indicator indicating that the HARQ-ACK feedback corresponding to the first data transmission is postponed, and wherein the first indicator indicates a non-numerical HARQ-ACK feedback timing offset value for the first data transmission.

17. The base station of claim 15, wherein the second DCI includes a second indicator indicating a set of HARQ feedback timing offset values from a plurality of sets of HARQ feedback timing offset values.

18. The base station of claim 15, wherein the second DCI includes a second indicator indicating an existence of the HARQ-ACK feedback postponed in the first FFP.

19. The UE of claim 10, wherein, to determine whether there is the HARQ-ACK feedback corresponding to the first data transmission postponed in the first FFP, the at least one processor is configured to cause the UE to:
　　receive first DCI for scheduling the first data transmission in the first FFP, wherein the first DCI includes a first indicator indicating that the HARQ-ACK feedback corresponding to the first data transmission is postponed.

20. A processor for wireless communication, comprising:
　　at least one controller coupled with at least one memory and configured to cause the processor to:
　　　　receive first downlink control information (DCI) for scheduling a first data transmission in a first fixed frame period (FFP);
　　　　receive second DCI for scheduling a second data transmission in a second FFP that is later than the first FFP;
　　　　receive indications of downlink association sets which respectively cover intra-FFP hybrid automatic repeat request acknowledgement (HARQ-ACK) feedback and cross-FFP HARQ-ACK feedback;
　　　　determine whether there is HARQ-ACK feedback corresponding to the first data transmission postponed in the first FFP based on the indications of the downlink association sets; and
　　　　transmit a HARQ-ACK codebook in the second FFP, wherein, in response to determining that the HARQ-ACK feedback corresponding to the first data transmission is postponed in the first FFP, the HARQ-ACK codebook comprises HARQ-ACK feedback corresponding to the second data transmission and the HARQ-ACK feedback corresponding to the first data transmission.

* * * * *